(12) United States Patent
Totsuka et al.

(10) Patent No.: US 7,958,379 B2
(45) Date of Patent: *Jun. 7, 2011

(54) SUBSTRATE BIAS SWITCHING UNIT FOR A LOW POWER PROCESSOR

(75) Inventors: Yonetaro Totsuka, Tokyo (JP); Koichiro Ishibashi, Saitama (JP); Hiroyuki Mizuno, Tokyo (JP); Osamu Nishii, Tokyo (JP); Kunio Uchiyama, Tokyo (JP); Takanori Shimura, Chiba (JP); Asako Sekine, Tokyo (JP); Yoichi Katsuki, Tokyo (JP); Susumu Narita, Tokyo (JP)

(73) Assignee: Renesas Electronics Corporation, Kanagawa (JP)

( * ) Notice: Subject to any disclaimer, the term of this patent is extended or adjusted under 35 U.S.C. 154(b) by 163 days.

This patent is subject to a terminal disclaimer.

(21) Appl. No.: 12/346,268

(22) Filed: Dec. 30, 2008

(65) Prior Publication Data

US 2010/0005324 A1    Jan. 7, 2010

Related U.S. Application Data

(63) Continuation of application No. 10/768,136, filed on Feb. 2, 2004, now Pat. No. 7,475,261, which is a continuation of application No. 09/308,488, filed as application No. PCT/JP97/04253 on Nov. 21, 1997, now Pat. No. 6,715,090.

(30) Foreign Application Priority Data

Nov. 21, 1996  (JP) .................................. 8-310380

(51) Int. Cl.
*G06F 1/00* (2006.01)
*G06F 1/26* (2006.01)
*G06F 1/32* (2006.01)
*B23K 11/24* (2006.01)

(52) U.S. Cl. ........ 713/300; 713/320; 713/323; 713/340; 323/318

(58) Field of Classification Search .................. 713/300, 713/320, 323, 340
See application file for complete search history.

(56) References Cited

U.S. PATENT DOCUMENTS

| 4,356,412 A | 10/1982 | Moench et al. |
| 4,460,835 A | 7/1984 | Masuoka |
| 5,111,058 A | 5/1992 | Martin |
| 5,167,024 A | 11/1992 | Smith et al. |

(Continued)

FOREIGN PATENT DOCUMENTS

EP        0675599 A2    10/1995

(Continued)

*Primary Examiner* — Ji H Bae
(74) *Attorney, Agent, or Firm* — Mattingly & Malur, P.C.

(57) ABSTRACT

The feature of the present invention consists in: a processor main circuit for executing program instruction strings on a processor chip; a substrate bias switching unit for switching voltages of substrate biases applied to a substrate of the processor main circuit; and an operation mode control unit for controlling, in response to the execution of an instruction to proceed to a stand-by mode in the processor main circuit, the substrate bias switching unit in such a way that the biases are switched over to voltages for the stand-by mode, and for controlling, in response to an interruption of the stand-by release from the outside, the substrate bias switching unit in such a way that the biases are switched over to voltages for a normal mode, and also for releasing, after the bias voltages switched thereto have been stabilized, the stand-by of the processor main circuit to restart the operation.

7 Claims, 15 Drawing Sheets

U.S. PATENT DOCUMENTS

| | | |
|---|---|---|
| 5,220,672 A | 6/1993 | Nakao et al. |
| 5,241,680 A | 8/1993 | Cole et al. |
| 5,339,446 A | 8/1994 | Yamasaki et al. |
| 5,442,307 A | 8/1995 | Shigehara et al. |
| 5,442,794 A | 8/1995 | Wisor et al. |
| 5,461,338 A | 10/1995 | Hirayama et al. |
| 5,526,313 A | 6/1996 | Etoh et al. |
| 5,557,231 A | 9/1996 | Yamaguchi et al. |
| 5,587,916 A | 12/1996 | Martinson et al. |
| 5,633,573 A | 5/1997 | van Phuoc et al. |
| 5,652,890 A | 7/1997 | Foster et al. |
| 5,721,935 A | 2/1998 | DeSchepper et al. |
| 5,778,237 A | 7/1998 | Yamamoto et al. |
| 5,812,860 A | 9/1998 | Horden et al. |
| 5,870,613 A | 2/1999 | White et al. |
| 5,917,365 A | 6/1999 | Houston |
| 6,031,411 A | 2/2000 | Tsay et al. |
| 6,715,090 B1 | 3/2004 | Totsuka et al. |
| 7,475,261 B2 * | 1/2009 | Totsuka et al. ................ 713/300 |

FOREIGN PATENT DOCUMENTS

| | | |
|---|---|---|
| EP | 0714099 A1 | 5/1996 |
| JP | 05-108194 | 4/1993 |
| JP | 06-089574 | 3/1994 |
| JP | 6-53496 | 12/1994 |
| JP | 7-254685 | 10/1995 |
| JP | 8-83487 | 3/1996 |
| JP | 8-204140 | 8/1996 |

* cited by examiner

FIG.9

| OPERATION MODE | SUBSTRATE BIAS CONTROL |
|---|---|
| RESET | NO CONTROL |
| NORMAL OPERATION | NO CONTROL |
| SLEEP | NO CONTROL |
| DEEP SLEEP | NO CONTROL |
| STAND-BY | CONTROL |
| HARD WARE STAND-BY | CONTROL |
| RTC BATTERY BACK-UP | CONTROL |
| IDDQ MEASUREMENT | CONTROL |

981 — RESET
982 — NORMAL OPERATION
983 — SLEEP
984 — DEEP SLEEP
985 — STAND-BY
986 — HARD WARE STAND-BY

FIG.12

|  | 983 | 984 |
|---|---|---|
|  | SLEEP | DEEP SLEEP |
| 971 — CPU | STOP | STOP |
| 972 — FPU | STOP | STOP |
| 973 — CACHE | STOP | STOP |
| 974 — BSC | OPERATE | STOP |
| 975 — DMAC | OPERATE | STOP |
| 976 — SCI | OPERATE | STOP |
| 977 — INTC | OPERATE | OPERATE |
| 978 — CPG | OPERATE | OPERATE | und
SUBSTRATE BIAS SWITCHING UNIT FOR A LOW POWER PROCESSOR

This is a continuation application of Ser. No. 10/768,136 filed on Feb. 2, 2004, which is a continuation application of U.S. Ser. No. 09/308,488, filed on May 20, 1999, now U.S. Pat. No. 6,715,090, the contents of which are hereby incorporated by reference into this application.

TECHNICAL FIELD

The present invention relates to a semiconductor integrated circuit device such as a processor, and more particularly to a microprocessor which is capable of realizing the high speed operation as well as the low power consumption by controlling substrate biases of a processor circuitry constituted by MOS transistors in accordance with an operation mode of the processor.

At the present time, for realization of a microprocessor, an integrated circuit employing CMOSs is widely used. The power consumption of the CMOS circuit is classified into the dynamic power consumption due to charge and discharge during the switching, and the static power consumption due to a leakage current. Out of them, since the dynamic power consumption is proportional to a power source voltage Vdd squared and hence occupies the large power consumption, in order to promote the low power consumption, it is effective to reduce the power source voltage. Then, in recent years, the power source voltages of many microprocessors have been reduced.

As for the present low power consumption type microprocessor, there is known the microprocessor which includes the power management mechanism and which has a plurality of operation modes provided therein and in accordance therewith, stops the supply of a clock to execution units during the stand-by. By stopping the clock supply, the dynamic power consumption due to the switching in the unnecessary units can be reduced as much as possible. However, the static power consumption due to the leakage current can not be reduced and hence still remains.

Since the operation speed of the CMOS circuit is decreased along with reduction of the power source voltage, in order to prevent the degradation of the operation speed, the threshold voltage of the MOS transistor needs to be reduced in conjunction with the reduction of the power supply voltage. However, since if the threshold voltage is reduced, then the leakage current is remarkably increased, along with the reduction of the power source voltage, the increase of the static power consumption due to the leakage current which was not conventionally large so much becomes remarkable. For this reason, it becomes a problem to realize a microprocessor in which the high speed is compatible with the low power consumption.

As for a method of solving the problem associated with both the operation speed and the leakage current of the MOS transistor circuit, a method wherein the threshold voltage of the MOS transistor is controlled by setting variably the substrate biases is disclosed in JP-A-6-53496.

The description will hereinbelow be given with respect to the device structure for use in setting variably the substrate biases with reference to FIG. 2. FIG. 2 shows a cross sectional view of a circuit having the CMOS structure. As shown in the figure, an n type well 205 is formed in a part of a surface layer of a p type well (p type substrate) 201, an n-channel MOS transistor consisting of an n⁺ type source/drain region 202, a gate oxide film 203 and a gate electrode 204 is formed on a surface of the p type well 201, and a p-channel MOS transistor consisting of a p⁺ type source/drain region 206, a gate oxide film 207 and a gate electrode 208 is formed on a surface of the n type well 205.

Normally, the source of the p-channel MOS transistor and the source of the n-channel MOS transistor are respectively connected to the power source voltage (hereinafter, referred as Vdd) and the ground electric potential (hereinafter, referred as Vss), and the drains of the n-channel MOS transistor and the p-channel MOS transistor are connected to the output signal. As for terminals through which the substrate biases are given, Vbp 209 is provided in the n type well 205 of the p-channel MOS transistor, and Vbn 210 is provided in the p type well 201 of the n-channel MOS transistor.

While when employing the device as shown in FIG. 2, normally, Vbp 209 is connected to Vdd and Vbn 210 is connected to Vss, during the non-operation of the circuits, these substrate biases are switched so that Vbp 209 is connected to the higher electric potential and Vbn 210 is connected to the lower electric potential, whereby the threshold voltages of the MOS transistors can be increased and hence the leakage current can be reduced.

DISCLOSURE OF THE INVENTION

In order to realize a microprocessor in which the high speed operation is compatible with the low power consumption, it is required that for the processor circuitry, the variable control of the substrate biases as described above is carried out, and during the operation of the processor, the threshold voltages of the MOS transistors are decreased to maintain the high speed operation, while during the stand-by thereof, the threshold voltages are increased to reduce the leakage current. However, in order to control variably the substrate biases of the processor, the timing of reactivating the processor in the proceeding of the operation mode of the processor when switching the substrate biases, in particular in the proceeding of the operation mode from the stand-by state to the operation state is accurately controlled, whereby the malfunction of the processor must be prevented.

The present invention was made in order to solve the above-mentioned problems, and it is therefore an object of the present invention to provide a high speed and low power consumption processor by realizing the above-mentioned substrate bias control, on a processor chip, which is applied to the various operation modes of the processor.

In order to solve the above-mentioned problems, a feature of the present invention is provided by providing: a processor main circuit for executing program instruction strings on a processor chip; a substrate bias switching unit for switching voltages of substrate biases applied to a substrate of the processor main circuit; and an operation mode control unit for controlling, in response to the execution of an instruction to proceed to a stand-by mode in the processor main circuit, the substrate bias switching unit in such a way that the biases are switched over to voltages for the stand-by mode, and for controlling, in response to an interruption of the stand-by release from the outside, the substrate bias switching unit in such a way that the biases are switched over to voltages for a normal mode, and also for releasing, after the bias voltages switched thereto have been stabilized, the stand-by of the processor main circuit to restart the operation.

In addition, another feature of the processor according to the present invention is that a semiconductor device of the processor chip has a triple well structure, and also the processor main circuit is formed on a well region different from those of the substrate bias switching unit and the operation mode control unit.

In addition, still another feature of the processor according to the present invention is that the operation mode control unit includes, as means for waiting, before restarting the operation of the processor main circuit when switching the biases, until the bias voltages switched thereto are stabilized, either an on-chip timer for measuring a lapse of the time period required for stabilizing the biases, or a sensor for detecting that the biases have been stabilized to predetermined voltages.

In addition, yet another feature of the processor according to the present invention is provided by providing: the processor main circuit in which the semiconductor device of the processor chip has a triple well structure and is divided into a plurality of functional modules which are respectively formed on the different wells; a substrate bias switching unit for switching the substrate biases to the substrate of the respective functional modules; a operation mode control unit for controlling, in response to execution to make stand-by one functional module or the plurality of functional modules in the processor main circuit, the substrate bias switching unit in such a way that the substrate biases of the one functional module or the plurality of functional modules are switched over to the voltages for the stand-by mode, and for controlling, when having received a signal to release the stand-by mode of the one functional module or the plurality of functional modules from the outside or the processor main circuit, the substrate bias switching unit in such a way that the biases are switched over to the voltages for a normal mode, and also for informing, after the bias voltages switched thereto have been stabilized, the processor main circuit of that the stand-by of the one functional module or the plurality of functional modules has been released.

In addition, a further feature of the processor according to the present invention is provided by providing: means for switching dynamically the operation speed of the processor main circuit; and an operation mode control unit for controlling, in response to execution of an instruction to change the operation frequency in the processor main circuit, the substrate bias switching unit in such a way that the substrate biases of the processor main circuit or the functional modules are switched to voltages which are suitable for the operation frequency thereof, and for informing, after the bias voltages switched thereto have been stabilized, the processor main circuit of that the switching of the operation speed has been completed.

Further, an even further feature of the processor according to the present invention is that the substrate bias switching unit is constituted by a substrate bias generating circuit for generating therein the voltages of the substrate biases.

In addition, the present invention also proposes a control method contributing to the promotion of the low power consumption of the device. That is, since while the transistor having the low threshold is operated at a high speed, the leakage current passing between the source and the drain is large to increase the power consumption, it is important to prevent the large leakage current therebetween.

As for the construction therefor, there is provided a control method of controlling the power consumption of a semiconductor integrated circuit device including a plurality of element circuit blocks having transistors formed on a semiconductor substrate and being operated on the basis of a clock signal, wherein a first mode in which all the element circuit blocks are operated on the basis of the clock signal, a second mode in which the supply of the clock signal to at least one of the element circuit blocks is stopped, and a third mode in which the supply of the clock signal to all the element circuit blocks is stopped and also substrate biases of at least part of the transistors formed on the semiconductor substrate are controlled to increase thresholds of the associated transistors are switched to be used.

A main circuit is, for example, a processor including a CPU and the like. The first mode is a mode wherein the main circuit carries out the normal operation (computing, storage or the like).

The second mode is a state in which the supply of the clock to a part of the processor is stopped, and is called a sleep mode, a deep sleep mode or the like for example. By selecting the range in which the clock is stopped, it is possible to promote the low power consumption while maintaining only the necessary functions.

The third mode is a mode wherein the substrate biases are controlled for the circuits of the processor so as to increase the thresholds of the transistors constituting the circuits to reduce the power consumption due to the sub-threshold leakage current, and is referred to as a stand-by mode or a hardware stand-by mode for example. While the operation mode can be returned from the stand-by mode to the normal state by the interruption control, in the hardware stand-by mode, the operation mode can be returned thereto by only the reset. In the third mode, the functions of the main circuit are stopped.

As for the construction of the overall circuitry, the element circuit blocks are included in a first circuit block, and the clock signal is formed from an oscillation circuit included in a second circuit block, and the clock signal and the information signals which are to be processed in the first circuit block are inputted from the second circuit block to the first circuit block. In addition to the oscillation circuit, an I/O circuit, and a control circuit for controlling the substrate biases are included in the second circuit block. Normally, the high speed operation is not required for the second circuit block so much as for the first circuit block. Then, it is desirable that the thresholds of the transistors constituting the second circuit block are larger than those of the transistors constituting the first circuit block and also the operation voltages of the former are higher than those of the latter. In addition, the transistors constituting the main circuit of the first circuit block are formed on the well different from those of other circuits, whereby the influence of other circuits thereupon can be reduced.

When the operation voltages of the first circuit block are different from those of the second circuit block, level conversion circuits are required to be provided between the first and second circuit blocks. For example, in order to carry out the conversion of the signal level, a level-down circuit is provided in the first circuit block, while a level-up circuit is provided in the second circuit block.

Since in the present invention, by switching the mode of the interest over to another mode, the substrate bias voltages are dynamically switched, in order to ensure the reliability, the operation sequence thereof is important.

When switching the operation mode from the first or second mode to the third mode, firstly, the clock signal which is inputted from the second circuit block to the first circuit block, and the information signals which are inputted to the first circuit block in order to be processed therein are stopped, and next, the substrate biases of at least part of the transistors formed on the semiconductor substrate are controlled to increase the thresholds of the associated transistors. As a result, the input to the first circuit block in the state in which the operation of the first circuit block is unstable can be blocked and also the malfunction of the first circuit block can be prevented.

For this operation, the procedure may be adopted in which after the signal inputs to the first circuit block are stopped and the device waits for a predetermined time period (e.g., 60 μsec. or so) through a timer or the like, the substrate biases are controlled. The timer for waiting is provided in the outside of the first circuit block, e.g., either in the second circuit block or in the outside of the device.

In addition, when switching the operation mode from the third mode (stand-by mode) to the first mode, the substrate biases of at least part of the transistors formed on the semiconductor substrate are controlled to decrease the thresholds of the associated transistors, and next, the input of the above-mentioned clock signal which is inputted from the second circuit block to the first circuit block and the information signals which are to be processed in the first circuit block is started. That is, in order to prevent the malfunction of the first circuit block, after the substrate voltages of the first circuit block have been stabilized, the input of the signals is started.

For this reason, when switching the operation mode from the third mode to the first mode, after the substrate biases of the first circuit block are controlled to decrease the thresholds of the associated transistors and the device waits for a predetermined time period by the timer so that the operation is stabilized, the input of the clock signal which is to be inputted to the first circuit block and other signals is started.

Another method is such that after the state of the thresholds of the transistors have been confirmed by a voltage monitor or the like, the signal input to the first circuit block is started. Or, on the basis of the state of a substrate bias generating circuit for controlling the substrate voltages, in accordance with the signal which is outputted from the substrate bias generating circuit in order to report the stand-by release, the input of the clock signal and other signals which are to be inputted to the first circuit block is started.

As for a method of stopping the information signals and the clock signal to the first circuit block, it is considered that the signal levels are fixed by an output fixing circuit (level holding circuit) provided in the second circuit block. In the first mode, while the signals are inputted to the level-down circuit through the output fixing circuit, in the third mode, the inputs to the level-down circuit are fixed.

BRIEF DESCRIPTION OF THE DRAWINGS

FIG. 9 is a view useful in explaining the relation between the operation modes and the substrate bias control of the present invention;

FIG. 12 is a view useful in explaining a sleep mode and a deep sleep mode of the present invention;

BEST MODE FOR CARRYING OUT THE INVENTION

Embodiments of the present invention will hereinafter be described with reference to the accompanying drawings.

Figure 1:
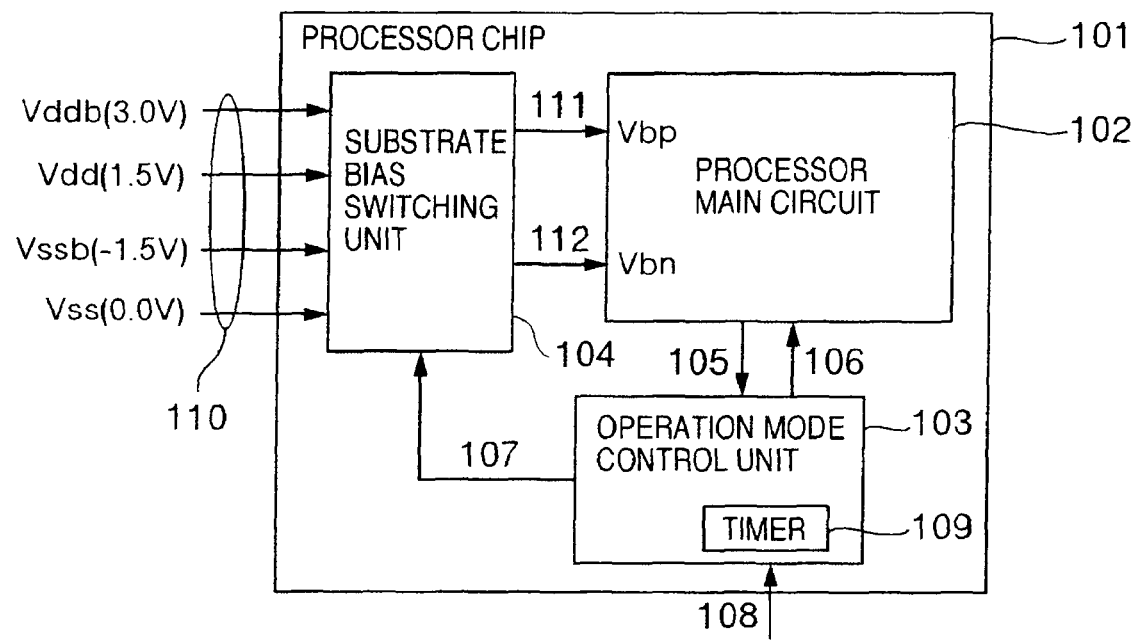
FIG. 1 is a block diagram of a processor chip in a first embodiment of the present invention.

FIG. 1 is a block diagram showing an example of a configuration of a processor chip for realizing a first embodiment of the present invention. In FIG. 1, a processor chip 101 is an LSI having a circuit of a CMOS structure, and includes a processor main circuit 102, an operation mode control unit 103, and a substrate bias switching unit 104. To the substrate bias switching unit 104, voltages Vdd and Vss in the normal mode, and voltages Vddb and Vssb in the stand-by mode are inputted through a signal 110. In accordance with a signal 107 outputted by the operation mode control unit, the substrate bias switching unit 104 selects, as the substrate bias for a p-channel MOS transistor constituting the processor main circuit 102, between Vdd and Vddb to output the selected one to a signal Vbp 111, and also selects, as the substrate bias for an n-channel MOS transistor, between Vss and Vssb to output the selected one to a signal Vbn 112. As for the voltage values for the substrate bias selection, for example, Vdd=1.5V, Vddb=3.0V, Vss=0.0V and Vssb=−1.5V.

Incidentally, as will be described later, a well 302 on which the processor main circuit 102 is formed is formed separately, independently of wells on which the substrate bias switching unit 104 and the operation mode control unit are respectively formed.

Figure 2:
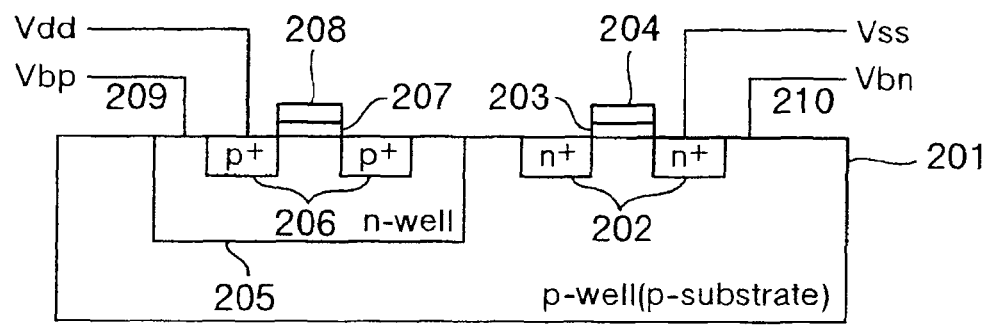
FIG. 2 is a cross sectional view showing a general device structure for use in substrate bias control.
Figure 3:
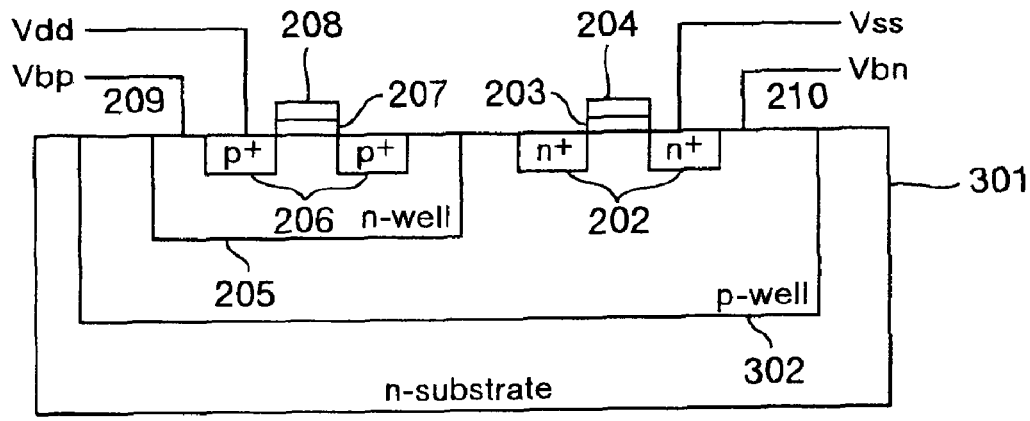
FIG. 3 is a cross sectional view showing a device structure in the first embodiment of the present invention.

FIG. 3 is a cross sectional view showing a device structure of the processor chip 101. A point of difference of FIG. 3 from FIG. 2 is that a p type well 302 is formed in an n type substrate 301 and the n type well 205 is formed in a part of the surface layer of the p type well 302, i.e., the device has a triple well structure. An n-channel MOS transistor is formed on the surface of the p type well 302 and a p-channel MOS transistor is formed on the surface of the n type well 205, thereby to constitute a CMOS circuit. In addition, a point that as for terminals through which the substrate biases are given, Vbp 209 is provided in the n type well 205 of the p-channel MOS transistor and Vbn 210 is provided in the p type well 302 of the n-channel MOS transistor is the same as in FIG. 2. In the present embodiment, the processor main circuit 102 is formed in the p type well 302 different from those of the operation mode control unit 103 and the substrate bias switching unit 104. As a result, the substrate bias control influences only the processor main circuit 102, and hence both the operation mode control unit 103 and the substrate bias switching unit 104 can avoid that influence.

Figure 4:
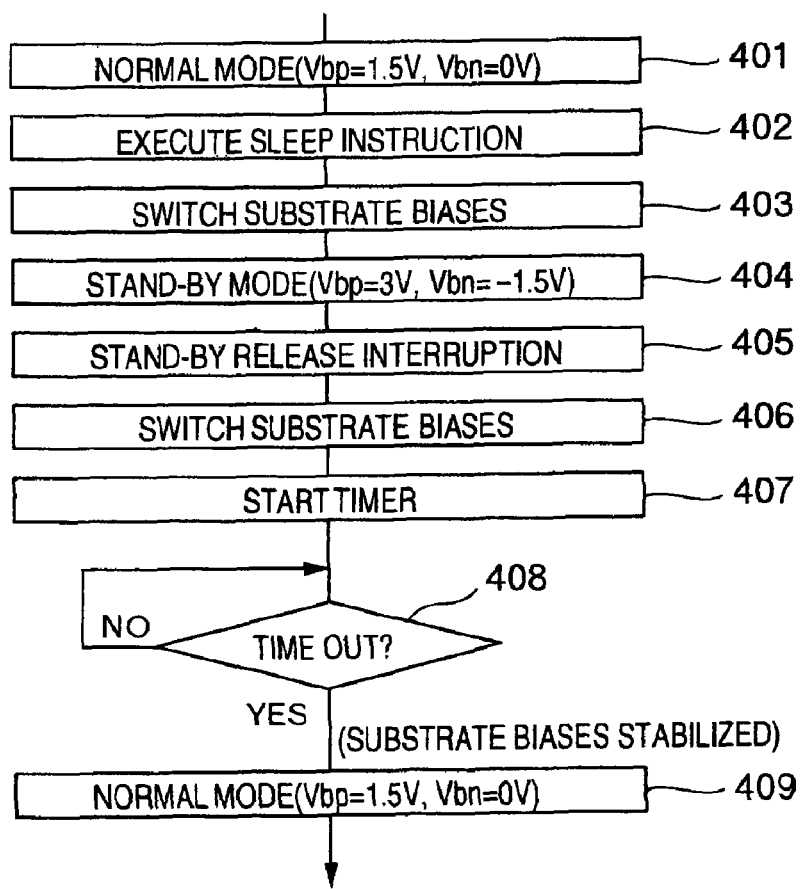
FIG. 4 is a flow chart useful in explaining the operation in the first embodiment of the present invention.

The description will hereinbelow be given with respect to the operation of the processor chip 101 in the present embodiment with reference to FIG. 4. The operation modes of the processor main circuit 102 are classified into the normal mode in which the normal instruction execution is carried out, and the stand-by mode in which the instruction execution is not carried out. FIG. 4 is a flow chart showing the processing on the processor chip 101 in the case where the operation mode of the processor main circuit 102 is changed from the normal mode to the stand-by mode and then is changed from the stand-by mode to the normal mode.

Firstly, the processor main circuit 102 is operated in the normal mode. At this time, the substrate bias switching unit 104 selects Vdd and Vss for the substrate biases Vbp 111 and Vbn 112, respectively. For the voltage values of the substrate biases in the normal mode in this example, Vbp=1.5V and Vbn=0V (Step 401).

After the processor main circuit 102 outputs, after having executed the sleep instruction, "stand-by request" to the signal 105 and then informs the operation mode control unit 103 of this fact, the processor main circuit 102 stops the operation of executing the instruction and then proceeds to the stand-by mode (Step 402).

After having received the signal 105 from the processor main circuit, the operation mode control unit 103 outputs the signal 107 in order for the substrate biases of the processor main circuit 102 to be switched over to the voltages for the stand-by mode. Then, in response to the signal 107, the substrate bias switching unit 104 selects Vddb and Vssb, out of the input voltages 110, for the substrate biases Vbp 111 and Vbn 112, respectively, to output Vddb and vssb (Steps 403 and 404). In this example, for the voltage values of the substrate biases in the stand-by mode, Vbp=3.0V and Vbn=−1.5V.

When the operation mode control unit 103 detects that when the processor main circuit 102 is in the stand-by state, "stand-by release interruption" is asserted from the outside to a signal 108 (Step 405), the unit 103 outputs the signal 107 in order for the substrate biases of the processor main circuit 102 to be switched over to the voltages for the normal mode. Then, in response to the signal 107, the substrate bias switching unit 104 switches the substrate biases Vbp 111 and Vbn 112 over to Vdd (1.5V) and Vss (0.0V), respectively (Step 406).

Since there is the possibility that a lapse of some time period is required until the biases are stabilized after having switched the substrate biases, if the operation of the processor main circuit 102 is immediately restarted, then the malfunction may occur. In order to avoid this possibility, before switching the operation mode of the processor main circuit 102, the operation mode control unit 103 sets a sufficient time period required for stabilization of the substrate bias voltages switched thereto in an on-chip timer 109 and then restarts the processor main circuit 102 (Step 407) and then waits until time-out (Step 408). Then, after time-out, the operation mode control unit 103 outputs "stand-by release" to the signal 106 and then informs the processor main circuit 102 of this fact. In response to the signal 106, the processor main circuit 102 proceeds to the normal mode and restarts the operation of executing an instruction (Step 409).

In such a way as described above, the substrate biases Vbp 111 and Vbn 112 of the processor main circuit 102 are controlled such that during the operation, the threshold voltages of the MOS transistors constituting the processor main circuit are decreased to cope with the high speed operation, while during the stand-by, the threshold voltages thereof are increased to able to reduce the leakage current.

Figure 5:
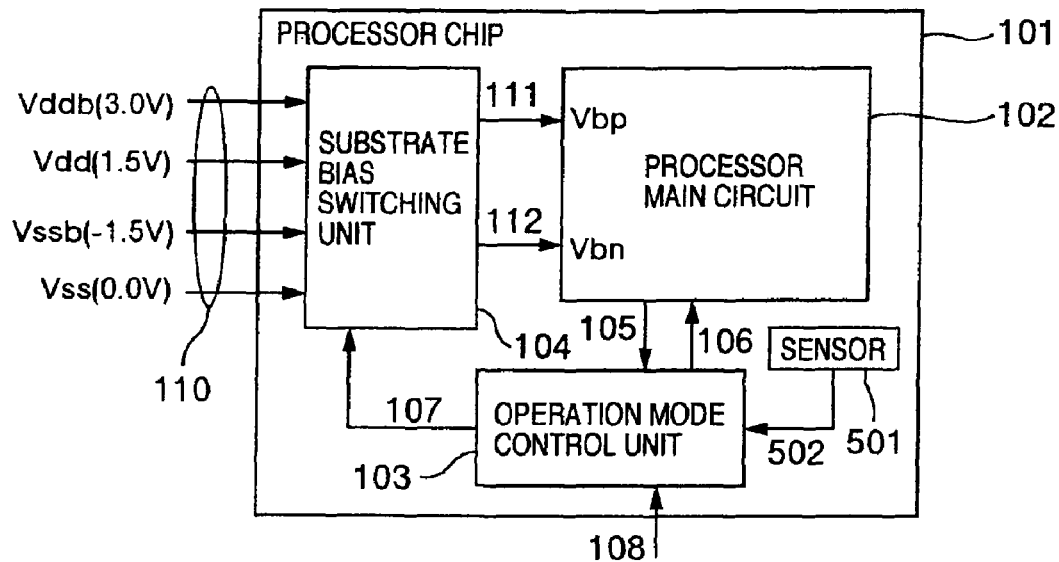
FIG. 5 is a block diagram of a processor chip in a second embodiment of the present invention.

FIG. 5 is a block diagram showing a configuration of the processor chip in a second embodiment of the present invention. In the present embodiment, the operation mode control unit 103 includes a sensor 501 for detecting the bias voltages which are applied to the substrate of the processor main circuit 102. When the operation mode of the processor main circuit 102 is changed from the normal mode to the stand-by mode, the processing procedure in the above-mentioned first embodiment is applied to the present embodiment. On the other hand, when the operation mode of the processor main circuit 102 is changed from the stand-by mode to the normal mode, similarly to the above-mentioned embodiment, after the operation mode control unit 103 has controlled the substrate bias switching unit 104 so as to switch the substrate biases to the voltages for the normal mode, the unit 103 waits until the sensor 501 outputs the signal relating to the fact that the voltages of the substrate biases switched thereto are stabilized to the predetermined values, i.e., Vbp=1.5V and Vbn=0.0V in the present embodiment to a signal 502. When the sensor 501 outputs the stabilization of the substrate biases to the signal 502, then the operation mode control unit 103 outputs "stand-by release" to the signal 106 in order to restart the operation of the processor main circuit 102.

Figure 6:
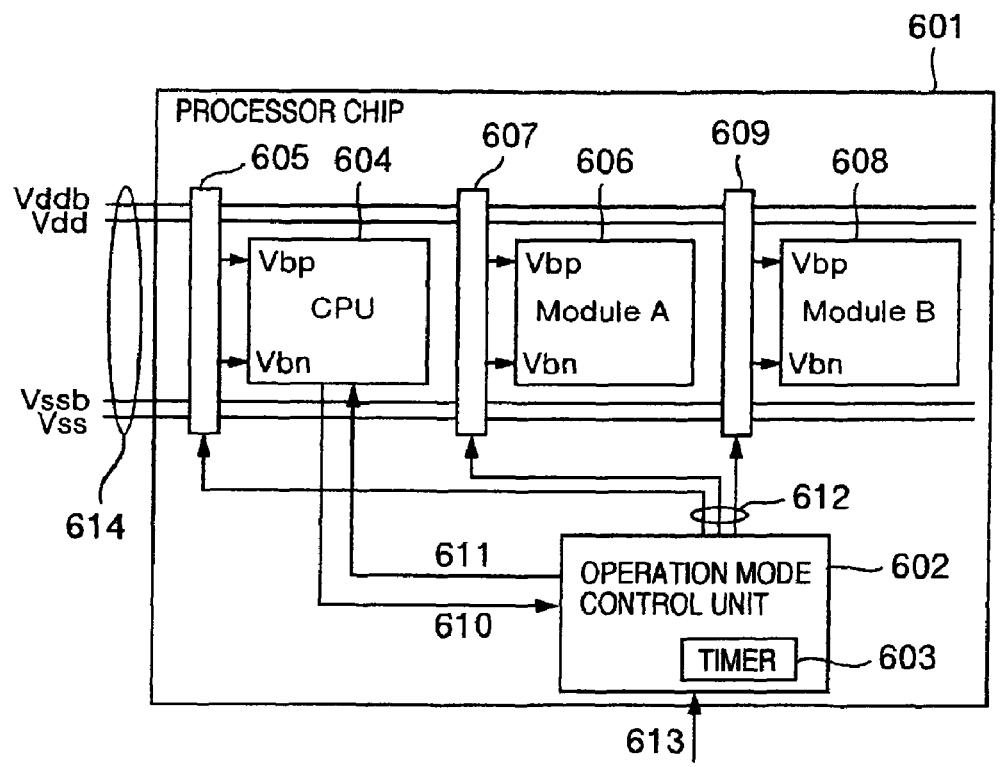
FIG. 6 is a block diagram of a processor chip in a third embodiment of the present invention.

FIG. 6 is a block diagram showing a configuration of a processor chip in a third embodiment of the present invention. As for the basic device structure of a processor chip 601, the triple well structure as shown in FIG. 3 is assumed. In the processor chip 601 of FIG. 6, the processor main circuit includes a CPU 604, and a plurality of functional modules such as a module A 606 and a module B 608. The functional modules are present separately on the respective different well regions and hence one functional module is not influenced by the substrate bias control for other functional modules. The functional module includes the elements, each having the smaller scale unit, such as a CPU, an FPU, a cache, or a computing element. Substrate bias switching units 605, 607 and 609 are respectively provided so as to correspond to the functional modules 604, 606 and 608, and can switch, similarly to the above-mentioned embodiments, the substrate biases of the corresponding functional modules. The execution of the instruction is carried out with the CPU, as one of the functional modules, as a center, and hence if any instruction to make stand-by any unnecessary functional module for execution is executed, then the operation mode control unit 602 is informed of that the functional module of interest is in the standby state.

Next, the description will hereinbelow be given with respect to the operation of the processor chip 601 in the present embodiment. Firstly, it is assumed that all the functional modules are operated in the normal mode. After having executed the instruction to make stand-by the module A, the CPU 604 outputs the stand-by request to a signal 610, and thereafter, it is impossible to use that module until the stand-by of the module A 606 is released. After having received the signal 610, the operation mode control unit 602 outputs a signal 612 to the substrate bias switching unit 607 and then switches the substrate biases of the module A 606 over to the voltages for the stand-by mode. When the module A 606 is in the stand-by state, after the operation mode control unit 602 has received the signal 610 from the CPU 604 or a signal relating to the standby release of the module A 606 from the signal 613 outside of the processor chip 601, the unit 602 outputs the signal 612 to the substrate bias switching unit 607 and then switches the substrate biases of the module A over to the voltages for the normal mode. Then, similarly to the first embodiment of the present invention, the operation mode control unit 602 waits the stabilization of the substrate biases switched thereto using an on-chip timer 603, and after the stabilization thereof, informs the CPU 604 through a signal 611 of that the stand-by of the module A is released. After the CPU 604 has received this signal 611, it becomes possible to execute the instruction using the module A.

The foregoing is applied to the stand-by control for the module B 608 as well as other functional modules. In addition, the CPU 604 itself is an object of the stand-by control. In this case, the functional module B 608 and other functional modules are controlled similarly to the case of the above-mentioned module A 604 except that after having proceeded to the stand-by mode, the CPU 604 stops all the instructions from being executed, and when the signal relating to the stand-by release of the CPU 604 has been asserted to the external signal 613, the operation mode control unit 602 asserts the stand-by release of the CPU 604 to the signal 611 after completion of the switching of the substrate biases of the CPU 604, thereby restarting the execution of the instructions of the CPU 604.

By the stand-by control in functional modules in the present embodiment, it is possible to reduce the leakage current of any functional module which is unnecessary during the operation of the processor.

Figure 7:
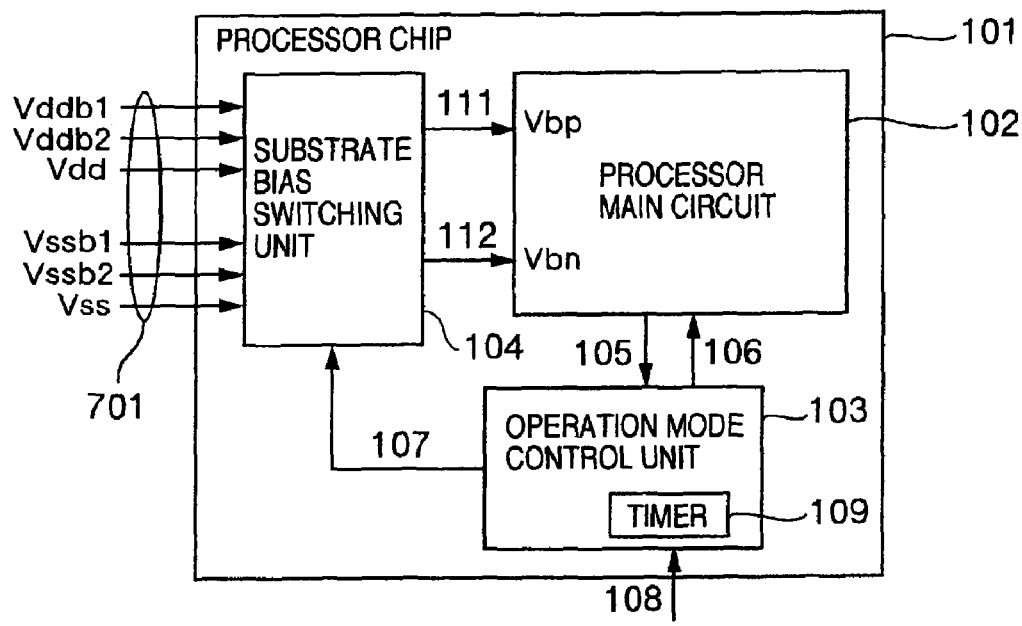
FIG. 7 is a block diagram of a processor chip in a fourth embodiment of the present invention.

FIG. 7 is a block diagram showing a configuration of a processor chip in a fourth embodiment of the present invention. A point of difference of the present embodiment from the first embodiment is that voltages 701 which are supplied from the outside to the substrate bias switching unit 104 are increased in kind so that the substrate bias switching unit 104 can select, as the substrate biases, the suitable voltages among these voltages 701 to apply them to the processor main circuit 102. In the present embodiment, it is assumed that means for changing dynamically the operation speed of the processor main circuit 102, i.e., the operation frequency thereof on the basis of an instruction, and the operation modes of the processor main circuit 102 are classified into a high speed mode and a low speed mode. In the present embodiment, Vdd (for the p-channel MOS transistor) and Vss (for the n-channel MOS transistor) are selected as the substrate biases corresponding to the high speed mode. Vddb2 (for the p-channel MOS transistor) and Vssb2 (for the n-channel MOS transistor) are selected as the substrate biases corresponding to the low speed mode, and Vddb1 (for the p-channel MOS transistor) and Vssb1 (for the n-channel MOS transistor) are selected as the substrate biases corresponding to the stand-by mode.

Next, the description will hereinbelow be given with respect to the operation of the processor chip 101 in the present embodiment. Now, it is assumed that the operation mode of the processor main circuit 102 is switched from the high speed mode over to the low speed mode. While the processor main circuit 102 is being operated in the high speed mode, as the substrate biases for the processor main circuit, the substrate switching unit 104 selects Vdd and Vss for Vbp 111 and Vbn 112, respectively. After having executed the instruction to proceed to the low speed mode, the processor main circuit 102 outputs this request to the signal 105 to suspend the operation of executing the instruction A clock which is supplied to the processor main circuit 102 is switched over to a low frequency on the basis of execution of the instruction to proceed to the low speed mode. After having received the signal 105, the operation mode control unit 103 outputs the signal 107 in order to switch the substrate biases of the processor main circuit 102 over to the voltages for the low speed mode. In response to the signal 107, the substrate bias switching unit 104 switches the substrate biases Vbp 111 and Vbn 112 over to Vddb2 and Vssb2, respectively. Similarly to the above-mentioned embodiments, the operation mode control unit 103 maintains the stability of the substrate biases switched thereto using the on-chip timer 109, and informs the processor main circuit 102 through the signal 106 of that the proceeding to the low speed mode has been completed. After having received the signal 106, the processor main circuit 102 restarts the suspended operation of executing the instruction in the low speed mode.

Since the operation in switching the operation mode from the low speed mode to the high speed mode, in switching the operation mode from the high speed mode or the low speed mode to the stand-by mode, or in switching the operation mode from the stand-by mode to the high speed mode or the low speed mode in the present embodiment is also similar to the foregoing, the details thereof will be omitted here. In the present embodiment, it is also possible that the operation speed is further subdivided and the substrate bias control corresponding thereto is carried out. In addition, it is also possible as in the third embodiment, the processor main circuit 102 is separated in functional modules by utilizing the triple well structure of the device, and for every functional module, the substrate biases are controlled in conjunction with the switching of the operation frequency thereof.

As in the present embodiment, the substrate bias control which is suitable for the operation frequency of the processor is carried out, whereby it is possible to reduce the leakage current in the low speed operation mode. In addition, since in the low speed mode, the range of the input voltages by which both the p-channel MOS transistor and the n-channel MOS transistor of the CMOS circuit are caused to conduct at the same time is narrower than that in the high speed operation mode, there is also provided the effect that the passing through current during the switching is reduced.

Figure 8:
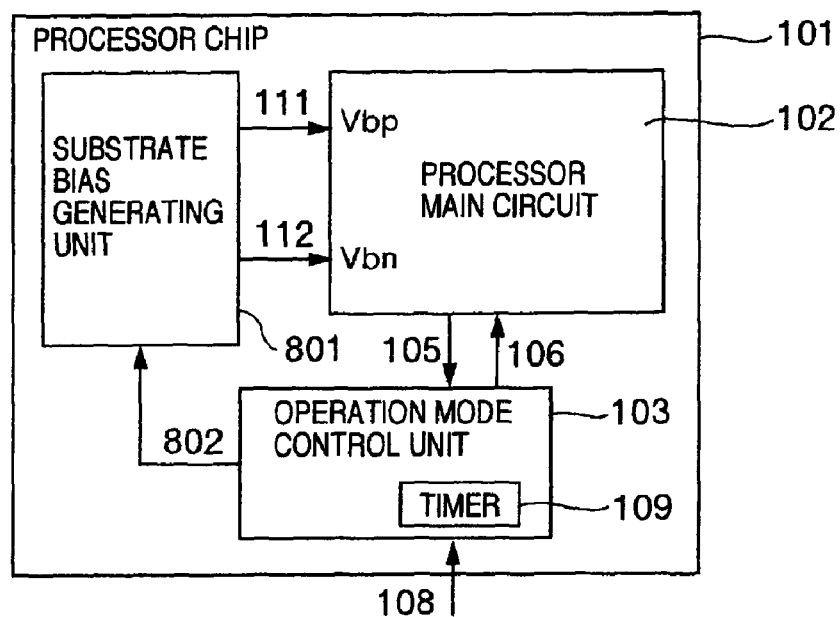
FIG. 8 is a block diagram of a processor chip in a fifth embodiment of the present invention.

FIG. 8 is a block diagram showing a configuration of a processor chip in a fifth embodiment of the present invention. A point of difference of the present embodiment from the above-mentioned first embodiment is that the above-mentioned substrate bias switching unit is constituted by a substrate bias generating unit 801. The substrate bias generating circuit 801 is controlled by an output signal 802 of the operation mode control unit 103 so that it generates in the inside the voltages of the substrate biases to output these voltages to Vbp 111 and Vbn 112, respectively. The voltage values of the substrate biases Vbp 111 and Vbn 112 which are generated in correspondence to the operation mode of the processor main circuit 102 under the control by the operation mode control unit 103 are the same values as those in the first embodiment. Since the operations of the processor main circuit 102 and the operation mode control unit 103 are the same as those in the first embodiment, the details thereof will be omitted here. In addition, similarly to the present embodiment, the substrate bias switching unit in the second, third and fourth embodiments is constituted by the substrate bias generating circuit 801, whereby the substrate biases can be generated in the inside of the processor chip to switch the substrate biases thus generated in accordance with the operation mode.

As described above, according to these embodiments, since the timing of reactivating the processor in the proceeding from the stand-by state to the operation state is accurately controlled using either the timer or the sensor, the optimal substrate bias control corresponding to the operation mode of the processor becomes possible. As a result, the leakage current can be reduced in the stand-by mode while maintaining the high speed when the operation mode of the processor is the normal mode. In addition, the substrate bias control is carried out in accordance with the operation mode by the functional module, whereby even when the processor is in operation, the leakage current of any functional module which is unnecessary for the execution can be reduced. Further, the substrate bias control which is suitable for the operation frequency of the processor is carried out, whereby in addition to the reduction of the leakage current in the low speed mode, there is also obtained the effect that the passing through current in the switching can be reduced.

As a result, the reduction of the power consumption can be effectively realized and also it is possible to provide a microprocessor in which the high speed operation is compatible with the low power consumption.

Hereinbelow, as an embodiment of a microcomputer, the operation mode in which the substrate biases are controlled will be described concretely. Then, it is assumed that the microcomputer has two power sources, i.e., a 1.8V power source and a 3.3V power source, and the substrate bias control is carried out by only the 1.8V power source. It is desirable that the circuit for supplying 1.8V is constituted by a MOS transistor having a relative low threshold (e.g., Vth<0.4V or so).

FIG. 9 shows one example of the operation modes of the microcomputer. The operation modes are classified into a normal operation mode 981 in which the microcomputer is normally operated, and a reset mode 982. The modes in each of which the microcomputer is operated with the low power consumption are classified into a sleep mode 983, a deep sleep mode 984, a stand-by mode 985, a hardware stand-by mode 986, and an RTC (real time clock) battery back-up mode. In addition, as the test mode, there is an IDDQ measurement.

Since the high speed operation is required during the normal operation 982, no control for the substrate biases is carried out. Since all the functions need to be reset during the reset 981, no control for the substrate biases is carried out. While in the low power consumption modes, no control for the substrate biases is carried out during the sleep 983 and the deep sleep 984 each having a short time period required for return from each of the low power consumption modes, in the case of the stand-by 985 and the hardware stand-by 986 in each of which emphasis is put on that the power consumption is reduced rather than the return time period, the substrate bias control is carried out. The RTC battery back-up mode is a mode wherein the voltage from the power source for the RTC circuit operating at 3.3V is supplied. Since to the RTC battery back-up mode, the transition is made from the low power consumption mode, the substrate bias control is carried out. In addition, since the IDDQ measurement is a mode wherein the stand-by current is measured to measure the passing through current due to the short-circuit or the failure of the transistor, in this case, it is required that the substrate biases are necessarily controlled so as to reduce the leakage electric power of the chip to make the discovery of the failure easy.

Figure 10:
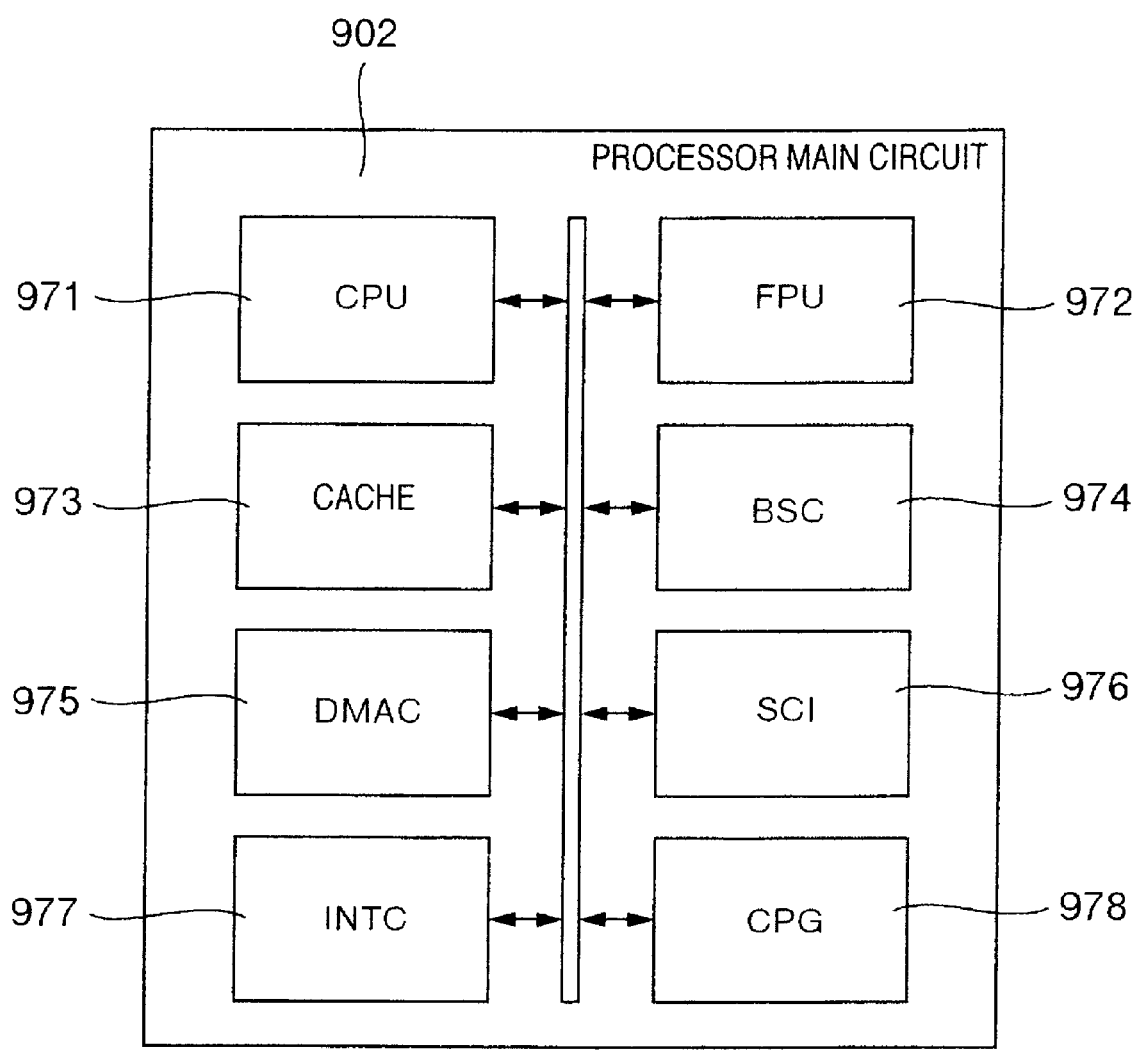
FIG. 10 is a view useful in explaining a configuration of a processor main circuit of the present invention.

Prior to description of the low power consumption operation modes, the description will hereinbelow be given with respect to a configuration of internal blocks of a processor main circuit 902 with reference to FIG. 10. This figure is one example of the main constituent blocks of the processor main circuit. As for computing circuits, there are a CPU (central computing processing unit) 971 and an FPU (floating-point computing unit) 972. In addition thereto, there are a cache 973 as a memory self contained in the chip, a BSC (bus control unit) 974 for carrying out the interface with an external memory, a DMAC (DMA control unit) 975 for carrying out the DMA (direct memory access), an SCI (serial control unit) 976 for controlling a serial port, an INTC (interruption control unit) 977 for controlling an interruption input, a CPG (clock control unit) 978 for controlling a clock, and the like.

Figure 11:
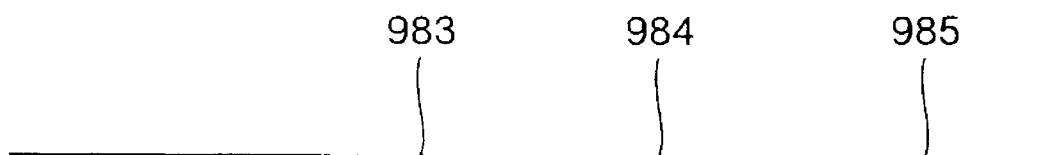
FIG. 11 is a view useful in explaining low power consumption modes of the present invention.

The description will hereinbelow be given with respect to the sleep 983, the deep sleep 984 and the stand-by 985 as the low power consumption modes with reference to FIG. 11.

In the sleep 983, only the clock for the computing units such as the CPU 971, the FPU 972, and the cache 973 is stopped and also the substrate bias control is not carried out. Therefore, though the power consumption can not be greatly reduced, the DMA transfer through the DMAC 975, and the normal refresh (refresh at the rate of 102 times/16 msec.) for the DRAM (dynamic RAM) and the SDRAM (synchronous dynamic RAM) through the BSC 974 are possible. Since the CPG 978 is in operation and the substrate bias control is not carried out, the time period required for return from the sleep 983 to the normal operation mode 982 is short.

Since in the stand-by 985 mode, all the operating clocks are stopped and also the substrate bias control is carried out, the power consumption is very small. Also, since all the clocks are stopped, it is impossible to carry out the DMA transfer. In addition, with respect to the refresh for the DRAM and the SDRAM, it is required that the control signals (RAS signal, CAS signal) for the memories are set using the BSC 974 in such a way that before entering into the stand-by 985, the mode becomes the self-refresh mode wherein the memories carry out the refresh by themselves. But, the time period required for return from the stand-by 985 to the normal operation 982 becomes long due to waiting for stability of the clock oscillation and a lapse of the time period required for return from the substrate biasing state since all the clocks are stopped.

The deep sleep 984 mode is the low power consumption mode between the sleep 983 and the stand-by 985.

The differences in operation modules between the sleep 983 and the deep sleep 984 are shown in FIG. 12. Since the BSC 973, the DMAC 974 and the SCI 975 which are operated during the sleep 983 are stopped during the deep sleep 984, the power consumption can be reduced so much.

But, in the deep sleep 984 mode, the DMA transfer can not be carried out and also the refresh of the memories becomes the self-refresh. The time period required for return from the deep sleep 984 to the normal operation 982 is, similarly to the sleep mode, short.

In such a way, the three kinds of low power consumption modes are provided, whereby the fine low power consumption control can be carried out in accordance with the application.

Figure 13:
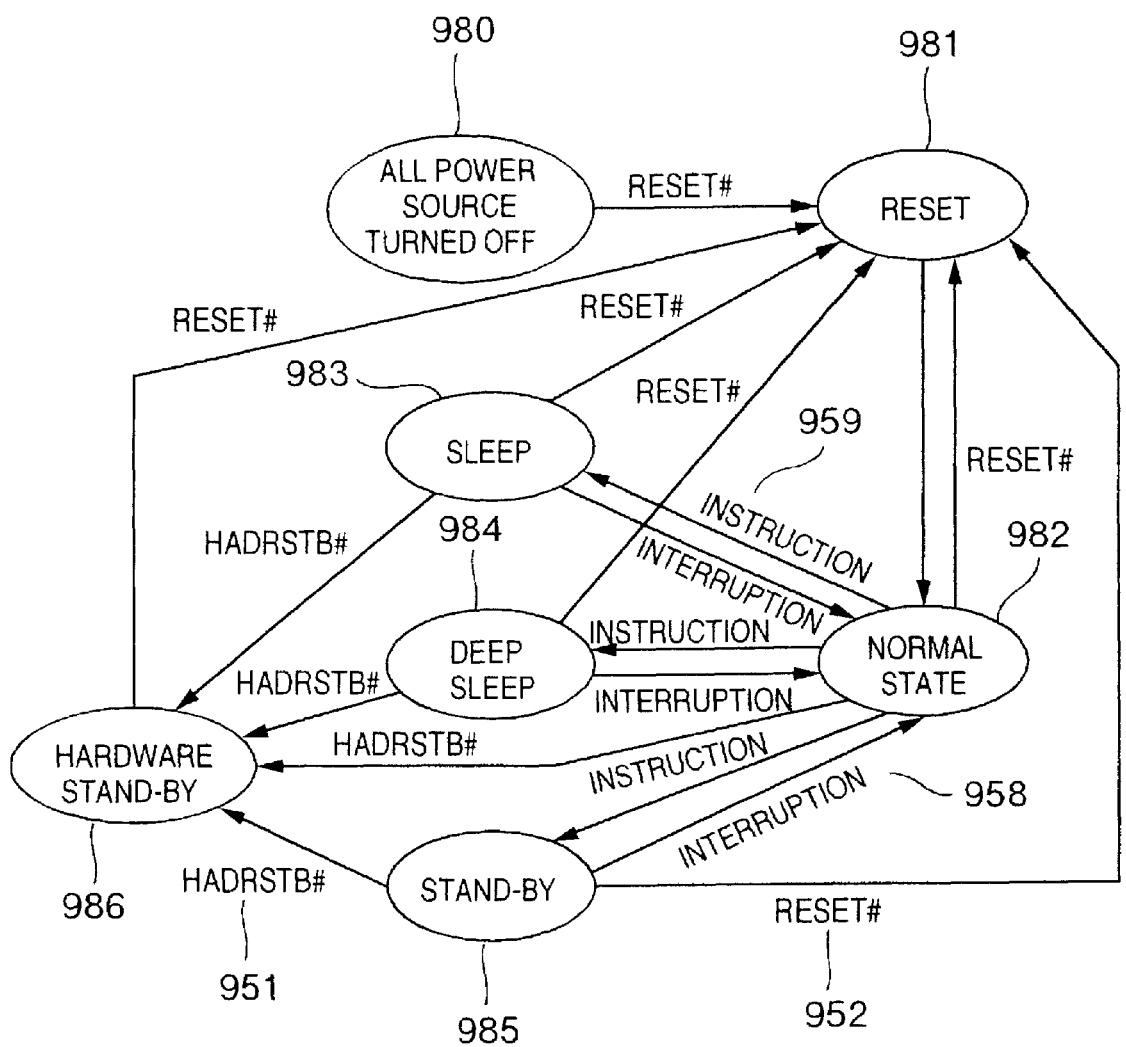
FIG. 13 is a transition diagram of the operation modes of the present invention.

FIG. 13 shows a state transition diagram of the operation modes in order to give the description thereof. On the basis of a RESET# 952 (or, a power-on reset) pin input from a state 980 in which all the power sources are turned off, the processor chip makes transition to a reset state 981. When RESET# 952 is negated, the processor chip makes transition to the normal operation 982. Then, the processor chip makes transition from this state to the low power consumption operation mode.

There are two transition methods. One transition method is the transition based on an instruction. The CPU 971 executes a sleep instruction, thereby making this transition. A mode register is set in executing the sleep instruction, whereby the selection can be made among the sleep 983, the deep sleep 984 and the stand-by 985, and the processor chip can make transition to the selected one of these modes. The return from each of these modes to the normal operation mode 982 is carried out on the basis of an instruction 958.

The other transition method is the transition based on a HARDSTB# 951 pin. When having asserted this pin, the processor chip makes transition to a hardware stand-by state 986. This state is a state wherein similarly to the stand-by 985, all the clocks are stopped and also the substrate bias control is carried out too.

If in this mode, the impedance of an I/O buffer is made high, then no transistor having the passing through current flowing therethrough is present in the 3.3V system circuit, and hence the IDDQ measurement becomes possible.

In addition, if an input buffer of an RTC circuit provided in the 3.3V system circuit is fixed, even when the power sources for the constituent elements other than the RTC circuit are turned off, the input signal to the RTC circuit does not become at floating (at an intermediate level). Therefore, the malfunction of the RTC circuit can be prevented and only the RTC circuit can be operated.

Next, the description will hereinbelow be given with respect to an application example of the hardware stand-by.

Figure 14:
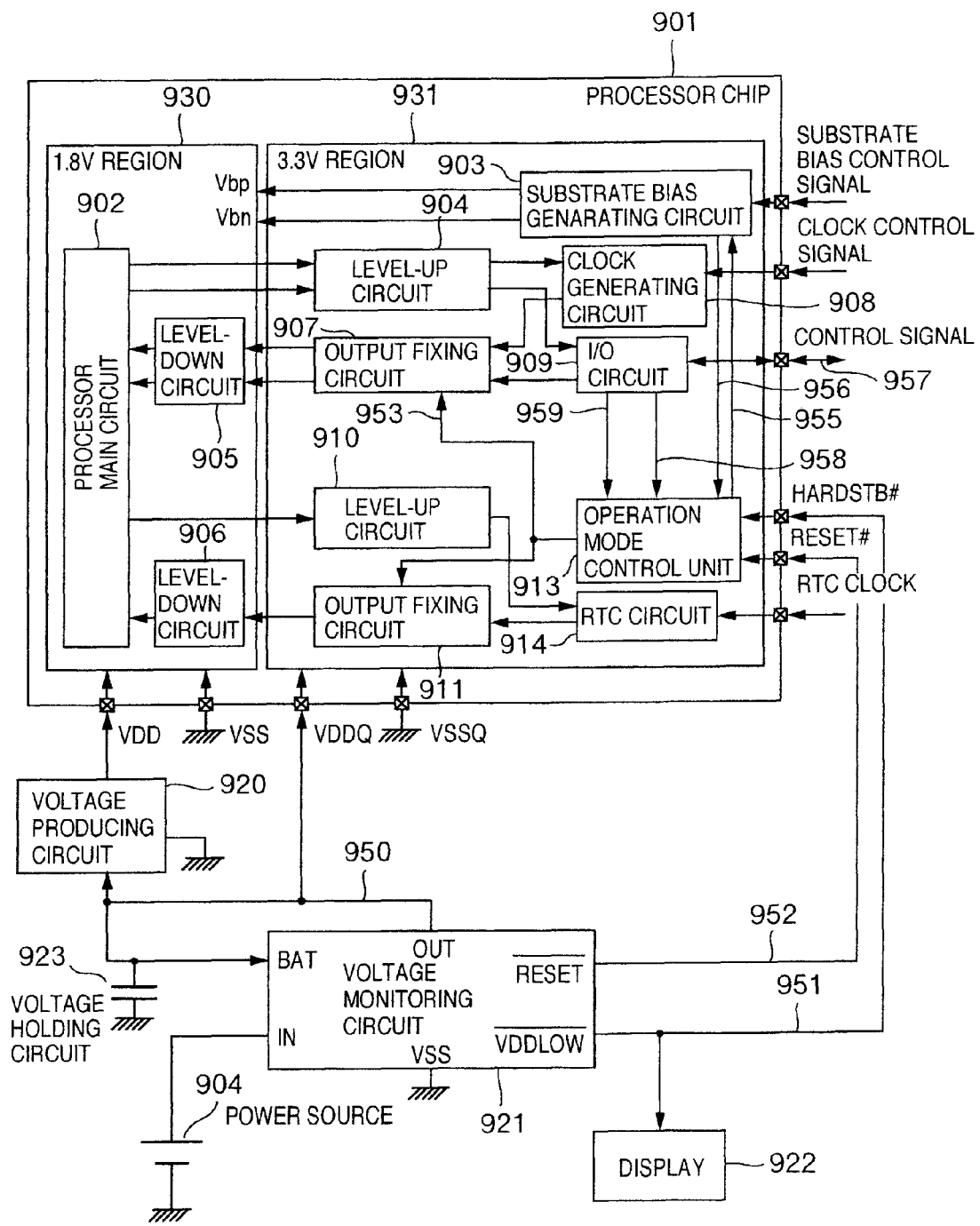
FIG. 14 is a first structural view showing a configuration of the processor chip and a power source control circuit of the present invention.

FIG. 14 shows configurations of a processor chip 901 and a power source control circuit in which the hardware stand-by is applied to enable a power source (battery) 904 of the processor chip 901 to be exchanged.

The processor chip 901 is constituted by a 1.8V region circuit 930 which is operated at 1.8V and a 3.3V region circuit 931 which is operated at 3.3V. The 1.8V region circuit 930 includes a processor main circuit 902, and level-down circuits 905 and 906 each of which carries out the level conversion from 3.3V down to 1.8V. The 3.3V region circuit 931 includes a substrate bias generating circuit 903, a clock oscillation circuit 908, an I/O circuit 909, an operation mode control unit 913, an RTC circuit 914, level-up circuits 904 and 910 each of which carries out the level conversion from 1.8V up to 3.3V, and output fixing circuits 907 and 911 each of which fixes a signal from 3.3V to 1.8V.

A control circuit for a power source system includes a power source 904, a power source monitoring circuit 921 a display 921, and a voltage producing circuit 920 for producing a voltage for a 1.8V system.

The operation will hereinbelow be described. When the processor chip 901 is in the normal operation mode 982, the substrate bias generating circuit 903 holds the normal substrate levels (e.g., the electric potential VDD for the p-channel MOS transistor, and the electric potential VSS for the n-channel MOS transistor) without carrying out the subtraction with respect to the substrate biases. The clock generating circuit 908 includes a PLL (phase-locked loop) and the like, and produces a clock for the internal operation to send it to the processor main circuit 902 through the output fixing circuit 907 and the level-down circuit 905. The I/O circuit 909 fetches in a signal from the outside to send it to the processor main circuit 902 through the output fixing circuit 907 and the level-down circuit 905. In addition, the I/O circuit 909 outputs a signal from the processor main circuit 902 to the outside through the level-up circuit 904. The RTC circuit 914 is operated at 3.3V, and receives a control signal from the processor main circuit 902 through the level-up circuit 910 to transmit a control signal to the processor main circuit 902 through the level-down circuit 906 and the output fixing circuit 911. The operation mode control unit 913 carries out, in particular, the control for the substrate bias generating circuit 903.

The power source monitoring circuit 921 monitors the voltage level of the power source 904. When the voltage level has been decreased down to a level lower than a predetermined level (When having detected the exhaustion state of the battery), the circuit 921 makes HARDSTB# 951 the low level. At the same time, the circuit 921 displays the alarm for the battery exhaustion on the display 922 to inform a user of this fact. Even in the state in which the voltage level has been decreased, the voltage holding circuit 923 can hold the voltage level for a predetermined time period (ranging from several minutes to several hours). For this time period, a user can exchange the power source.

Figure 15:
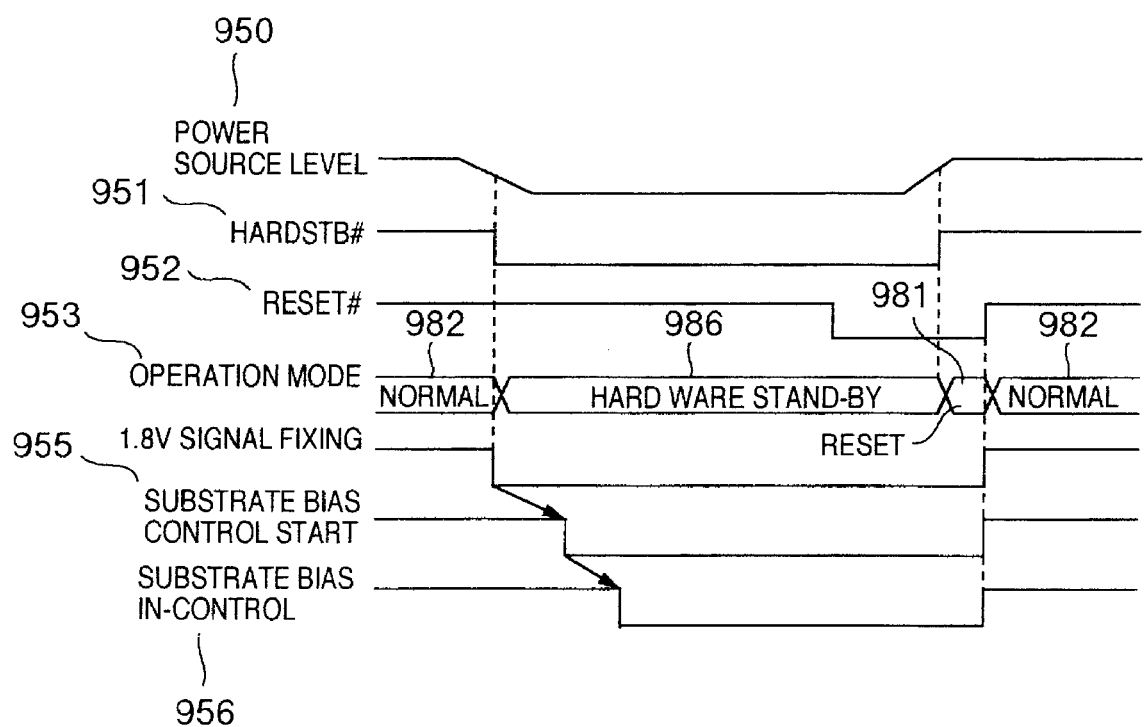
FIG. 15 is a view useful in explaining a sequence of exchanging a power source of the present invention.

The description will hereinbelow be given with respect to a power source exchanging sequence with reference to FIG. 15.

(1) HARDSTB# 951 becomes the low level, whereby the operation mode enters into the hardware stand-by state 986. Now, 1.8V signal fixing 953 is outputted from the operation mode control unit 913 to fix the signal from 3.3V to 1.8V and also to stop a 1.8V system clock. As a result, even when carrying out the subtraction with respect to the substrate biases, the signal of 1.8V system is not operated. Therefore, the malfunction of the 1.8V system circuit in the state of carrying out the subtraction with respect to the substrate biases (the state in which since the threshold voltages of the MOS transistors are increases, the operation speed thereof is low and hence the substrate electric potentials are unstable) is prevented. In this state, a substrate bias control starting signal 955 is outputted to the substrate bias producing circuit 903.

(2) Thereafter, on the basis of the timing of the 1.8V signal fixing 953, the substrate bias control starting signal 955 is outputted to the substrate bias producing circuit 903. In actual, the signal is fixed between the signal fixing 953 and the substrate bias control start 955, and hence a time difference until the supply of the signals to the 1.8V region is stopped is set therein. This time difference can be measured by the timer bases on the RTC clock of the RTC circuit 914.

(3) In response to the substrate bias control starting signal 955, the substrate bias generating circuit 903 starts carrying out the subtraction with respect to the substrate biases for the 1.8V system substrate. For a time period of carrying out the subtraction with respect to the substrate biases, a substrate bias in-control 956 signal is returned back to the operation mode control unit 913.

(4) In the state of carrying out the subtraction with respect to the substrate biases, the processor main circuit 902 is not operated. In addition, since the leakage current is small, the consumption quantity of current is small. As a result, the hold time of the voltage holding circuit 923 becomes long.

(5) Under this state, the power source 904 is exchanged.

(6) Since after having exchanged the power source, the power source voltage recovers the normal level, HARDSTB# 951 returns to the high level.

(7) Thereafter, the power-on reset circuit is operated and RESET# 952 is inputted thereto. On the basis of this reset input, the substrate bias control starting signal 955 which is outputted from the operation mode control unit 913 is released.

(8) In response to release of the substrate bias control starting signal 955, the substrate bias generating circuit 903 starts returning the substrate biases of the substrate to the electric potentials in the operation state (e.g., the electric potential VDD for the p-channel MOS transistor, and the electric potential VSS for the n-channel MOS transistor). A predetermined time period is required until recovery of the substrate biases, and after completion of the recovery of the substrate biases, the substrate bias in-control signal 956 is released to inform the operation mode control unit 913 of this result.

(9) In response to release of the substrate bias in-control signal 956, the 1.8V signal fixing 953 which is outputted from the operation mode control unit 913 is released, and then the signals are inputted to the 1.8V system circuits such as the processor main circuit 902 and the like.

(10) After completion of the reset state 981, the operation mode enters into the normal state 982, and the processor main circuit 902 starts the normal operation.

As described above, by utilizing the low power consumption mode by the hardware stand-by, the exchange of the power source 904 becomes possible.

Next, the description will hereinbelow be given with respect to a second application example of the hardware stand-by.

Figure 16:
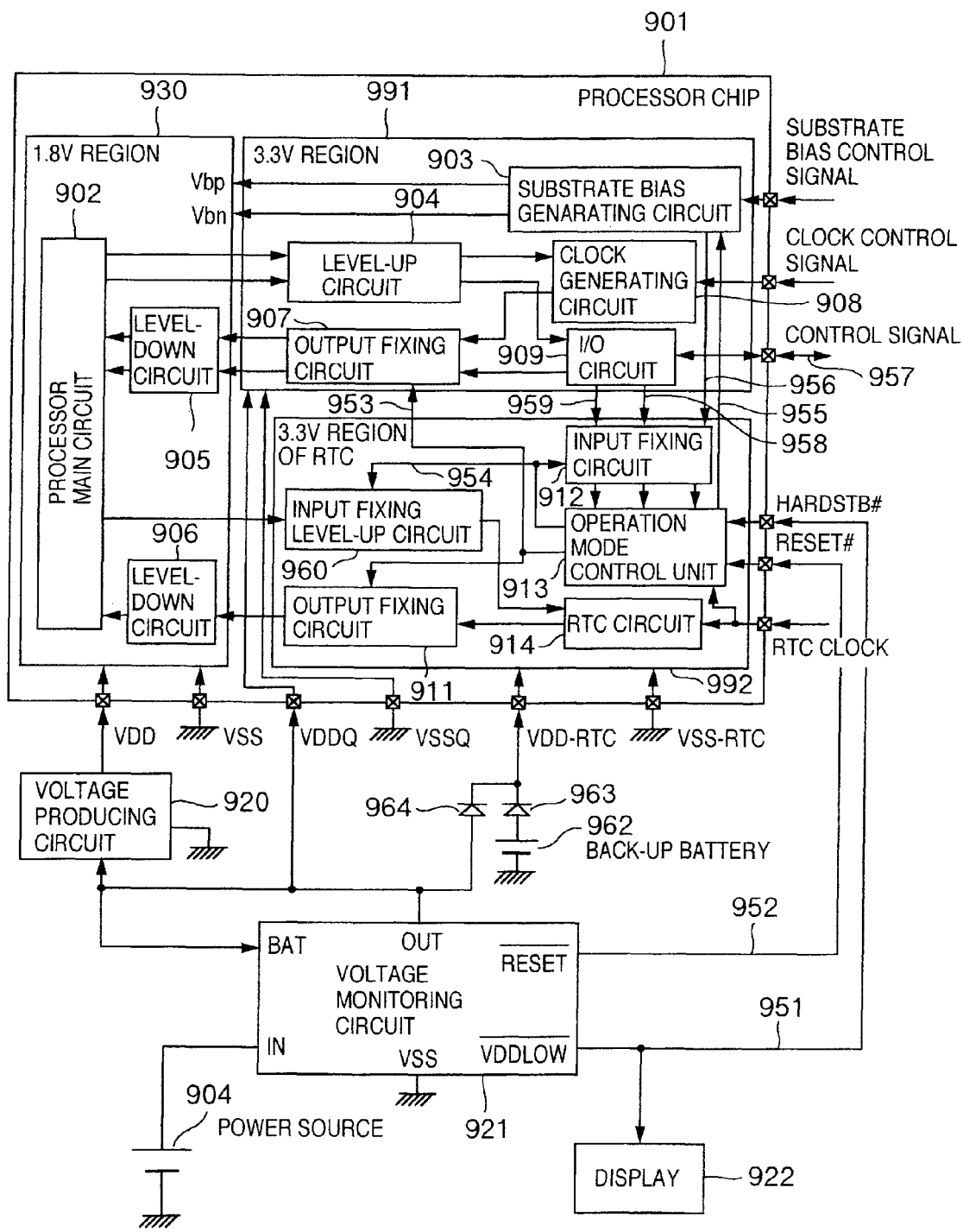
FIG. 16 is a second structural view showing a configuration of the processor chip and the power source control circuit of the present invention.

FIG. 16 shows an example of a configuration of realizing the RTC power source back-up mode. The RTC circuit 914 is called a real time counter and is provided for realizing the function such as a clock or a calendar. For this reason, the function of a clock can not be realized if the circuit 914 is not operated at all times. Even if the power source 904 is shutoff, the RTC circuit 914 needs to be operated.

In the embodiment shown here, in order to realize the RTC power source back-up mode, the 3.3V region is divided into a normal 3.3V region 991 and a region 992 in which the associated circuits are operated at 3.3V of the RTC. In addition, in the region of 3.3V of the RTC, both an input fixing circuit 912 and an input fixing level-up circuit 960 are added to the input circuit so that even when in the state in which other power sources (1.8V, the normal 3.3V power source) are shut-off, the input signal becomes at floating, the signal of an intermediate level is not transmitted to the region 992 in which the associated circuits are operated at 3.3V of the RTC. In such a way, the malfunction is prevented.

The control circuit for the power source system includes a back-up battery 962, and diodes 963 and 964 in addition to the power source 904, the power source monitoring circuit 921, the display 922, and the voltage producing circuit 920 for producing the voltage of 1.5V system.

The operation will hereinbelow be described. In the normal operation mode 982, the substrate bias generating circuit 903 holds the normal substrate levels without carrying out the subtraction with respect to the substrate biases. The clock oscillation circuit 908 includes a PLL (phased-locked loop) and the like, and produces a clock for the internal operation to send it to the processor main circuit 902 through both the output fixing circuit 907 and the level-down circuit 905. The I/O circuit 909 fetches in the signal from the outside and sends the signal thus fetched in to the processor main circuit 902 through both the output fixing circuit 907 and the level-down circuit 905. In addition, the circuit 909 outputs the signal from the processor main circuit 902 to the outside through the level-up circuit 904. The RTC circuit 914 is operated at 3.3V and receives the control signal from the processor main circuit 902 via the input fixing level-up circuit 960 to transmit the control signal to the processor main circuit 902 via both the level-down circuit 906 and the output fixing circuit 911. The operation mode control unit 913 receives the control signal via the input fixing circuit 912 to in particular carry out the control for the substrate bias generating circuit 903.

The voltage monitoring circuit 921 monitors the voltage level of the power source 904. When the voltage level has been decreased down to a level lower than a predetermined level (When having detected the state in which the battery is exhausted up), the circuit 921 makes HARDSTB# 951 a low level, and fixes the inputs to the RTC 3.3V region 992 to prevent the malfunction of the RTC circuit 914. At the same time, the circuit 921 displays the alarm of exhaustion of the battery on the display 922. Thereafter, the voltage level continues to be decreased so that the voltages of 3.3V and 1.8V systems will not be supplied to the processor chip 901. At this time, the voltages (VDD-RTC, VSS-RTC) are supplied to only the 3.3V region of the RTC from the back-up battery 962 via the diode 963, and hence even when the power source 904 is exhausted up, only the RTC circuit (the counter circuit for a calendar) 914 is normally operated. The diode 964 serves to prevent the current from being caused to flow through the circuits other than the RTC circuit 914.

Figure 17:
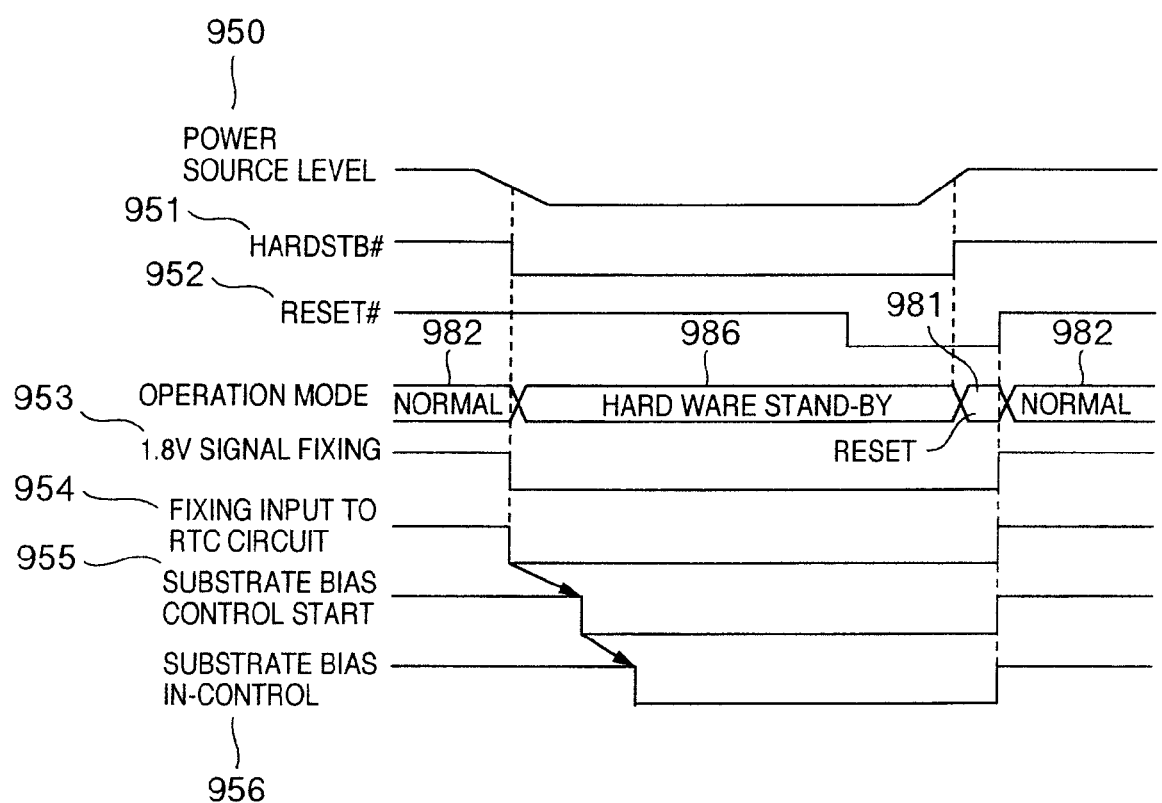
FIG. 17 is a view useful in explaining a sequence of RTC power source back-up of the present invention.

The RTC power source back-up sequence will hereinbelow be described in detail with reference to FIG. 17.

(1) HARDSTB# 951 becomes a low level, whereby the operation mode enters into the hardware stand-by state 986. Then, the 1.8V signal fixing 953 is outputted from the operation mode control unit 913 to fix the signal from 3.3V to 1.8V and also to stop the clock of 1.8V system. As a result, since even when carrying out the subtraction with respect to the substrate biases, the signals of 1.8V system are not operated, the malfunction of the circuits of 1.8V system in the state of carrying out the subtraction with respect to the substrate biases is prevented. At the same time, the input fixing signal 954 to the RTC circuit 914 is outputted to fix the input signal. As a result, when other power sources are shut-off, the unstable signal of the intermediate level is prevented from entering into the RTC circuit 914.

(2) Thereafter, on the basis of the timing of the 1.8V signal fixing 953, the substrate bias control starting signal 955 is outputted to the substrate bias producing circuit 903. In actual, the signal is fixed between the signal fixing 953 and the substrate bias control state 955, and hence a time difference until the supply of the signals to the 1.8V region is stopped is set therein. This time difference can be measured by the timer based on the RTC clock of the RTC circuit 914.

(3) In response to the substrate bias control starting signal 955, the substrate bias generating circuit 903 starts carrying out the subtraction with respect to the substrate biases of the substrate of 1.8V system. For a time period of carrying out the subtraction with respect to the substrate biases, the substrate bias in-control 956 signal is returned to the operation mode control unit 913.

(4) In the state of carrying out the subtraction with respect to the substrate biases, the processor main circuit 902 is not operated. In addition, since the leakage current is small, the consumption quantity of current is small.

(5) The shut-off time period of the power source 904 may be long. In addition, the power source 904 can be exchanged.

(6) Since after return from the shut-off of the power source 904 (or after exchange of the power source 904), the power source voltage recovers the normal level, HARDSTB# 951 is returned to the high level.

(7) Thereafter, the power-on reset circuit is operated and RESET# 952 is inputted. On the basis of this reset input, the substrate bias control starting signal 955 is released.

(8) In response to release of the substrate bias control starting signal 955, the substrate bias generating circuit 903 starts returning the substrate biases of the substrate of 1.8V system to the electric potentials in the operation state (e.g., the electric potential VDD for the p-channel MOS transistor, and the electric potential VSS for the n-channel MOS transistor). A predetermined time period is required until recovery of the substrate biases, and after completion of the recovery of the substrate biases, on the basis of release of the substrate bias in-control signal 956, the operation mode control unit 913 is informed of the completion of the recovery.

(9) In response to release of the substrate bias in-control signal 956, the 1.8V signal fixing 953 which is outputted from the operation mode control unit 913 is released, and the signals are inputted to the circuits of 1.8V system such as the processor main circuit 902 and the like.

(10) After completion of the reset state 981, the operation mode enters into the normal state 982, and the processor main circuit 902 starts the normal operation.

In the above-mentioned sequence, a power source switch is provided in the power source 904 so that for a time period when the power source is turned off, only the RTC circuit 914 can be operated.

As described above, by utilizing the hardware stand-by, only the RTC circuit 914 can be operated on the basis of the back-up by the back-up battery.

Figure 18:
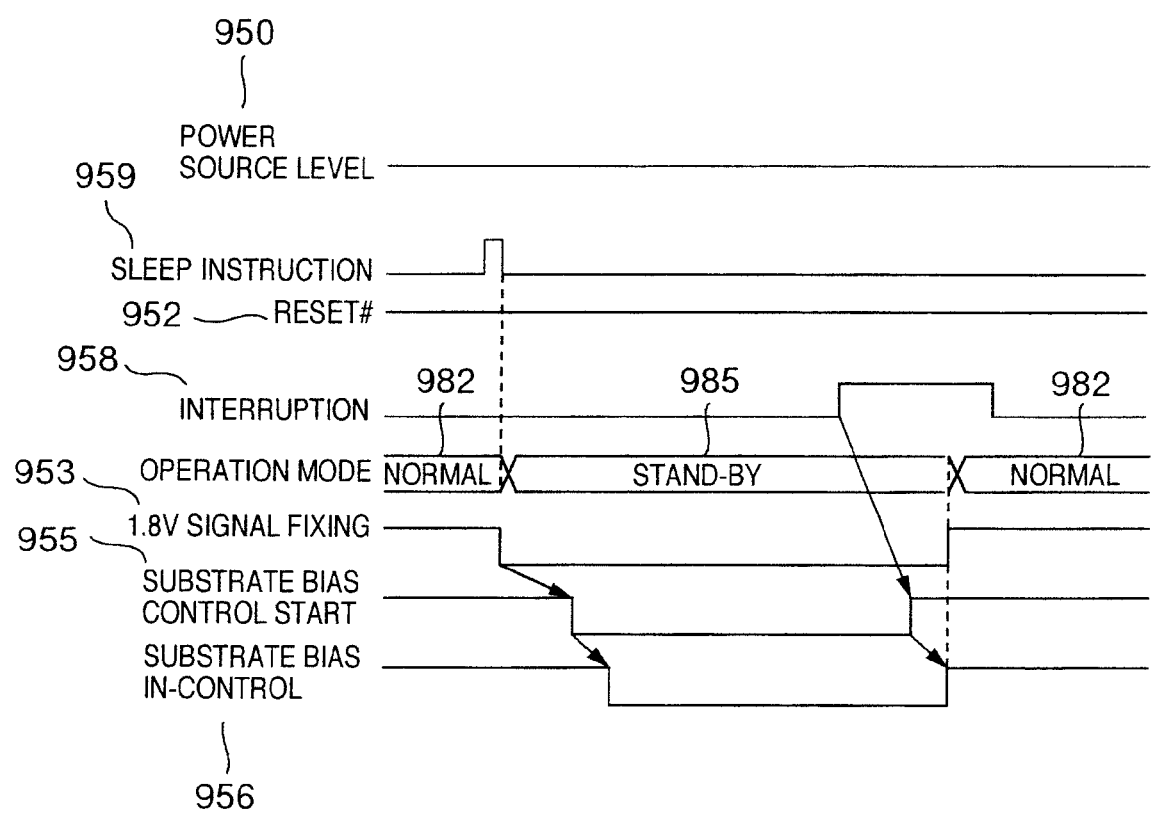
FIG. 18 is a view useful in explaining a sequence until return by interruption from the low power consumption mode of the present invention.

The description will hereinbelow be given with respect to the sequence in which by utilizing a normal sleep instruction 959, the operation mode enters into a stand-by state 985, and then on the basis of an interruption signal 958, the operation mode returns to the normal state 982 with reference to FIG. 18.

(1) On the basis of the sleep instruction 959, the operation mode enters into the stand-by state 985. Then, the 1.8V signal fixing 953 is outputted from the operation mode control unit 913 to fix the signal from 3.3V to 1.8V and also to stop the clock of 1.8V system. As a result, the malfunction of the circuits of 1.8V system when carrying out the subtraction with respect to the substrate biases is prevented.

(2) Thereafter, on the basis of the 1.8V signal fixing 953, the substrate bias control starting signal 955 is outputted to the substrate bias producing circuit 903. In actual, the signal is fixed between the signal fixing 953 and the substrate bias control state 955, and hence a time difference until the supply of the signals to the 1.8V region is stopped is set therein. This time difference can be measured by the timer based on the RTC clock of the RTC circuit 914.

(3) In response to the substrate bias control starting signal 955, the substrate bias generating circuit 903 starts carrying out the subtraction with respect to the substrate biases of the substrate of 1.8V system. For a time period of carrying out the subtraction with respect to the substrate biases, the substrate bias in-control 956 signal is returned to the operation mode control unit 913.

(4) In the state of carrying out the subtraction with respect to the substrate biases, the processor main circuit 902 is not operated. In addition, since the leakage current is small, the consumption quantity of current is small.

(5) Under this state, after having received the interruption signal 958 from the control signal 957 (external pin) via the I/O circuit 909, the operation mode control unit 913 releases the substrate bias control starting signal 955.

(6) In response to release of the substrate bias control starting signal 955, the substrate bias generating circuit 903 starts returning the substrate biases of the substrate of 1.8V system to the electric potentials in the operation state (e.g., the electric potential VDD for the p-channel MOS transistor, and the electric potential VSS for the n-channel MOS transistor). A predetermined time period is required until recovery of the substrate biases, and after completion of the recovery of the substrate biases, on the basis of release of the substrate bias in-control signal 956, the operation mode control unit 913 is informed of the completion of the recovery thereof.

(7) In response to release of the substrate bias in-control signal 956, the operation mode control unit 913 releases the 1.8V signal fixing 953. The 1.8V signal fixing 953 is released after having released the substrate bias in-control signal, whereby the malfunction of the circuits of 1.8V system is prevented.

(8) The signals are inputted to the circuits of 1.8V system such as the processor main circuit 902 and the like so that the operation mode enters into the normal state 982 and the processor main circuit 902 starts the normal operation.

On the basis of the foregoing, the processor chip 901 enters into the low power consumption mode and also can return thereto by the interruption.

Figure 19:
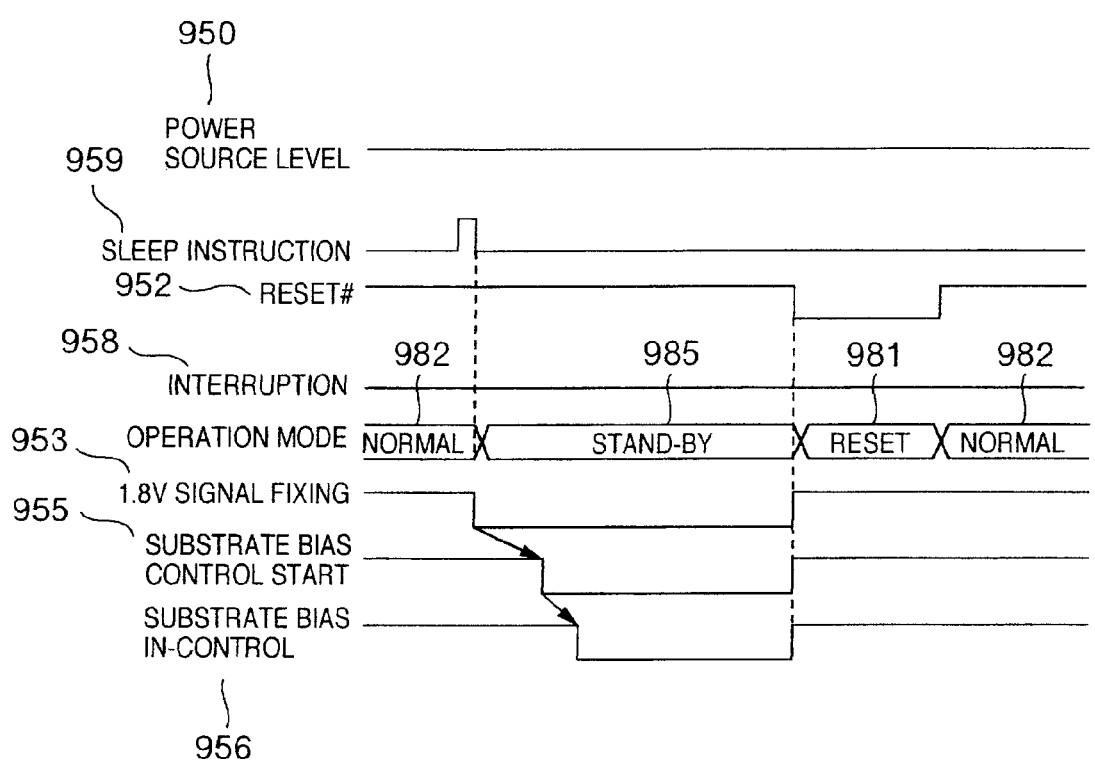
FIG. 19 is a view useful in explaining a sequence until return by reset from the low power consumption mode of the present invention.

The description will hereinbelow be given with respect to the sequence in which by using the normal sleep instruction 959, the operation mode enters into the stand-by state 985 and then returns to the normal state 982 by RESET# 952 with reference to FIG. 19.

(1) On the basis of the sleep instruction 959, the operation mode enters into the stand-by state 985. Then, the 1.8V signal fixing 953 is outputted from the operation mode control unit 913 to fix the signal from 3.3V to 1.8V and also to stop the clock of 1.8V system. As a result, the malfunction of the circuits of 1.8V system when carrying out the subtraction with respect to the substrate biases is prevented.

Thereafter, it is measured that on the basis of the 1.8V signal fixing 953, the signal fixing has been completed, and then the substrate bias control starting signal 955 is outputted to the substrate bias producing circuit 903.

(2) In response to the substrate bias control starting signal 955, the substrate bias generating circuit 903 starts carrying out the subtraction with respect to the substrate biases of the substrate of 1.8V system. For a time period of carrying out the subtraction with respect to the substrate biases, the substrate bias in-control 956 signal is returned to the operation mode control unit 913.

(3) In the state of carrying out the subtraction with respect to the substrate biases, the processor main circuit 902 is not operated. In addition, since the leakage current is small, the consumption quantity of current is small.

(4) Under this state, the operation mode control unit 913 receives RESET# 952 to release the substrate bias control starting signal 955.

(5) In response to release of the substrate bias control starting signal 955, the substrate bias generating circuit 903 starts returning the substrate biases of the substrate of 1.8V system to the electric potentials in the operation state. After completion of the return of the substrate biases, the operation mode control unit 913 is informed of the completion of the return using the substrate bias in-control signal 956.

(6) In response to this release signal, the 1.8V signal fixing 953 is released.

(7) After completion of the reset state 981, the signals are inputted to the circuits of 1.8V system such as the processor main circuit 902 and the like, and the operation mode enters into the normal state 982 and also the processor main circuit 902 starts the normal operation.

On the basis of the foregoing, the processor chip 901 enters into the low power consumption mode and also can return thereto by the reset.

As set forth hereinabove, the processor chip 901 has a section to which 1.8V is supplied as the power source voltage, and a section to which 3.3V is supplied as the power source voltage. The section to which 1.8V is supplied includes the processor main circuit 902 and the like for example. This section is a section wherein the circuit scale is large and the high speed operation is required. Since the circuit scale is large and also the high speed operation is required, the power consumption in this section becomes large. In the present embodiment, the power source voltage is reduced in order to reduce that power consumption.

In addition, since if the power source voltage is decreased (e.g., 1.8V), then the operation speed becomes slow, the threshold voltages of the MOS transistors are decreased (e.g., Vth<0.4V or so). In addition, in the present embodiment, the substrate voltage control is carried out in order to reduce the sub-threshold leakage current due to the decrease of the threshold voltage.

On the other hand, the section to which 3.3V is supplied as the power source voltage includes the RTC circuit 914 and the like for example. Since these circuits are small in scale and are operated at the low speed, the power consumption is small. Therefore, for such circuit blocks, the power source voltage does not need to be decreased. For example, the relation of Vth>0.5V or so can be established. Thus, since the threshold voltage of the MOS transistor does not need to be decreased, there is obtained the advantage that the current measure by the substrate control is not required in order to reduce the sub-threshold leakage current.

The processor chip 901 of the present embodiment uses both the power source voltages appropriately. That is, for the section requiring the large scale high speed operation, the MOS having the low threshold voltage is used by controlling the substrate, and also the MOS transistor having the high threshold voltage is used without controlling the substrate. While the method of manufacturing the MOS transistors having the different threshold values is not limited in particular, it can be realized by changing the channel implantation quantity. In addition, it can be realized by changing the thickness of the gate oxide film. In the latter, the technique may be adopted wherein for the construction of the MOS transistor, the oxide film is thickened to increase the threshold voltage. This reason is that since the MOS transistor having the high threshold voltage is operated at a high voltage, the oxide film b needs to be thickened. If the threshold voltage can be increased by thickening the oxide film, then the process can be simplified.

In addition, since the I/O circuit 909 needs to transmit/receive the external signal amplitude of 3.3V, if the MOS transistor which is the same as the MOS transistor having the high threshold voltage is employed therefor, then the process can be desirably made common thereto.

The invention claimed is:

1. A microprocessor comprising:
 a logic circuit including transistors and having a first mode and a second mode;
 a substrate bias control circuit changing a substrate bias voltage which is supplied to a well in which the transistors of the logic circuit are formed, and
 an operation mode control circuit operating in response to an execution of a first instruction which indicates to change to the first mode or a first interruption which indicates to change to the second mode,
 wherein the microprocessor receives a power source from a battery,
 wherein the operation mode control circuit controls the substrate bias control circuit in response to the first instruction so as to change the substrate bias voltage to a first voltage for the first mode when a voltage of the power source is lower than a predetermined voltage,
 wherein the operation mode control circuit controls the substrate bias control circuit in response to the first interruption so as to change the substrate bias voltage to a second voltage for the second mode,
 wherein the logic circuit is controlled in response to the first instruction so as not to change the input thereof when the voltage of the power source is lower than the predetermined voltage,
 wherein an absolute value of a threshold voltage of the transistors of the logic circuit that are supplied with the voltage for the first mode is higher than an absolute value of a threshold voltage of the transistors of the logic circuit that are supplied with the voltage for the second mode, and
 wherein the logic circuit starts the operation after detecting that the substrate bias voltage is stabilized when changing from the voltage for the first mode to the voltage for the second mode.

2. A microprocessor according to claim 1,
 wherein the substrate of the microprocessor has a multiple well structure,
 wherein the multiple well structure forms a second semiconductor region of a second conductivity type in a first semiconductor region of a first conductivity type, and a third semiconductor region of the first conductivity type in the second semiconductor region, and
 wherein transistors which are the first conductivity type are formed in the second semiconductor region, and transistors which are the second conductivity type in the third semiconductor region.

3. A microprocessor according to claim 2,
 wherein the third semiconductor region in which the transistors of the logic circuit are formed is different from a semiconductor region in which the transistors of the substrate bias control circuit and the operation mode control circuit are formed.

4. A microprocessor according to claim 1,
 wherein the operation mode control circuit has a timer to count a time required for a stabilization of the substrate bias voltage.

5. A microprocessor according to claim 1,
 wherein the operation mode control circuit has a sensor which detects that the substrate bias voltage is stabilized at a predetermined voltage.

6. A microprocessor according to claim 1,
 wherein the substrate bias control circuit has a substrate bias voltage generator which generates the substrate bias voltage.

7. A microprocessor according to claim 1,
 wherein the first mode is a standby mode in which the operation of the logic circuit is a standby state, and
 wherein the second mode is a normal mode in which the logic circuit operates normally.

* * * * *